US009065285B2

(12) United States Patent
Jin et al.

(10) Patent No.: US 9,065,285 B2
(45) Date of Patent: Jun. 23, 2015

(54) METHOD AND APPARATUS FOR PREVENTING MISOPERATION IN AN ELECTRIC POWER SYSTEM

(75) Inventors: Shuqiang Jin, Zhuhai (CN); Lingzhi Pang, Zhuhai (CN); Liguo Wan, Zhuhai (CN); Jiandong Huang, Zhuhai (CN); Hongping Jiang, Zhuhai (CN)

(73) Assignee: YOUTECH, INC., Mountain View, CA (US)

( * ) Notice: Subject to any disclaimer, the term of this patent is extended or adjusted under 35 U.S.C. 154(b) by 104 days.

(21) Appl. No.: 13/473,437

(22) Filed: May 16, 2012

(65) Prior Publication Data
US 2013/0024037 A1   Jan. 24, 2013

Related U.S. Application Data

(60) Provisional application No. 61/509,965, filed on Jul. 20, 2011.

(51) Int. Cl.
*H02J 3/00* (2006.01)
*G05B 17/02* (2006.01)
*H02J 13/00* (2006.01)

(52) U.S. Cl.
CPC .............. *H02J 3/005* (2013.01); *G05B 17/02* (2013.01); *H02J 13/0006* (2013.01); *H02J 2003/007* (2013.01); *Y04S 40/22* (2013.01); *Y02E 60/76* (2013.01)

(58) Field of Classification Search
None
See application file for complete search history.

(56) References Cited

U.S. PATENT DOCUMENTS

| 4,507,703 A | * | 3/1985 | Blau et al. ................. 361/193 |
| 4,767,941 A | * | 8/1988 | Brand et al. ................ 307/43 |
| 5,963,734 A | * | 10/1999 | Ackerman et al. ......... 703/18 |

(Continued)

FOREIGN PATENT DOCUMENTS

WO   WO 2011057434 A1 *  5/2011

OTHER PUBLICATIONS

Nilssen, R.; Mo, O., "KREAN, a new simulation program for power electronic circuits," Power Electronics Specialists Conference, 1990. PESC '90 Record., 21st Annual IEEE , pp. 506-511, 1990.*

(Continued)

*Primary Examiner* — Darrin Dunn
*Assistant Examiner* — Christopher E Everett
(74) *Attorney, Agent, or Firm* — Shun Yao; Park, Vaughan, Fleming & Dowler LLP

(57) ABSTRACT

One embodiment provides a computer system for preventing switching errors in a power system that includes a plurality of switching devices. The system includes a topology-extraction mechanism configured to extract topology information associated with the power system; a status database configured to store status information associated with the switching devices; a rule database configured to store user-definable operation rules associated with the switching devices; a receiving mechanism configured to receive a request for performing a switching operation on a device; a simulation mechanism configured to perform a simulation based on the extracted topology information, the status information, and a rule associated with the device; a determination mechanism configured to determine whether the switching operation is allowed based on an outcome of the simulation; and a display mechanism configured to display an output of the determination mechanism.

19 Claims, 7 Drawing Sheets
(1 of 7 Drawing Sheet(s) Filed in Color)

(56) References Cited

U.S. PATENT DOCUMENTS

| | | | |
|---|---|---|---|
| 6,885,915 B2* | 4/2005 | Rehtanz et al. | 700/291 |
| 8,180,622 B2* | 5/2012 | Nasle | 703/18 |
| 8,229,722 B2* | 7/2012 | Nasle | 703/13 |
| 8,249,851 B2* | 8/2012 | Nam et al. | 703/18 |
| 8,265,908 B2* | 9/2012 | Kirrmann et al. | 702/188 |
| 2004/0153303 A1* | 8/2004 | Tang et al. | 703/18 |
| 2006/0108871 A1* | 5/2006 | Wimmer | 307/4 |
| 2006/0116794 A1* | 6/2006 | Stoupis et al. | 700/286 |
| 2008/0133207 A1* | 6/2008 | Chaiquin | 703/18 |
| 2009/0271170 A1* | 10/2009 | De Barros et al. | 703/21 |
| 2009/0276265 A1* | 11/2009 | Ahmed et al. | 705/7 |
| 2010/0332211 A1* | 12/2010 | Oudalov et al. | 703/23 |
| 2011/0106321 A1* | 5/2011 | Cherian et al. | 700/286 |
| 2011/0153536 A1* | 6/2011 | Yang et al. | 706/47 |
| 2011/0257804 A1* | 10/2011 | Goel et al. | 700/291 |
| 2011/0257956 A1* | 10/2011 | Goel et al. | 703/18 |
| 2012/0022713 A1* | 1/2012 | Deaver et al. | 700/298 |
| 2012/0089384 A1* | 4/2012 | Coyne et al. | 703/18 |
| 2012/0206235 A1* | 8/2012 | Jin et al. | 340/5.64 |

OTHER PUBLICATIONS

Mohan, N.; Robbins, W.P.; Undeland, T.M.; Nilssen, R.; Mo, O., "Simulation of power electronic and motion control systems—an overview," Proceedings of the IEEE, vol. 82, No. 8, pp. 1287-1302, Aug. 1994.*

* cited by examiner

METHOD AND APPARATUS FOR PREVENTING MISOPERATION IN AN ELECTRIC POWER SYSTEM

RELATED APPLICATION

This application claims the benefit of U.S. Provisional Application No. 61/509,965, entitled "Method and System for Preventing Misoperation in an Electric Power System," by inventors Shuqiang Jin, Lingzhi Pang, Liguo Wan, Jiandong Huang, and Hongping Jiang, filed 20 Jul. 2011.

BACKGROUND

1. Field

The present disclosure relates generally to management of an electric power system. More specifically, the present disclosure relates to a system used for preventing switching errors in an electric power system.

2. Related Art

In complex electric power plants or transmission substations, where various types of equipment are operating at high voltages, switching errors can lead to disastrous outcomes, such as interruptions of power, damages to equipment, and loss of human life. A number of factors can cause switching errors, including equipment failure, faults of the control system, human error, and inadequate interlocking devices. Statistics have shown that most switching errors are caused by human error, which can be prevented with proper interlocking design.

Common switching errors include energizing a grounded line, closing a ground switch when energized, de-energizing or load dropping using a disconnector instead of a breaker, or entering an energized switching bay. In order to prevent these switching errors, it is essential to ensure that the correct switching sequence is followed by the switching personnel. In addition, the switching personnel must be fully aware of the impact of each switching step and have the assurance that the next step is proven safe before the actual switching takes place. This requires a simulation system that models the connectivity of a substation and the interlocking logic among the switching operations. Before operating on a piece of equipment, a worker is required to perform a switching-sequence simulation, which verifies whether the sequence of operations complies with safety rules and regulations. If an operation step violates a safety rule, the simulation system notifies the worker such operation cannot proceed.

Conventional switching-sequence simulation systems rely on human programmers to generate and input logic expressions that describe operation of the equipment, which can require a huge amount of work for a large-scale, complex power system, and thus is prone to unintended omissions or typographical errors. In addition, operation of certain complex equipment (such as a bridge transformer) may involve complex logic, making it difficult to summarize all possible operating modes.

SUMMARY

One embodiment of the present invention provides a computer system for preventing switching errors in a power system that includes a plurality of switching devices. The system includes a topology-extraction mechanism configured to extract topology information associated with the power system; a status database configured to store status information associated with the switching devices; a rule database configured to store user-definable operation rules associated with the switching devices; a receiving mechanism configured to receive, from a user, a request for performing a switching operation on a device in the power system; a simulation mechanism configured to perform a simulation based on the extracted topology information, the status information, and one or more rules associated with the device; a determination mechanism configured to determine whether the switching operation is allowed based on an outcome of the simulation; and a display mechanism configured to display an output of the determination mechanism. The display mechanism is further configured to display an error message to the user in response to the switching operation not being allowed.

In a variation on this embodiment, the system further includes a transmission mechanism and a handheld smart key. The transmission mechanism is configured to transmit a switching order based on the outcome of the simulation to the smart key, and the smart key is configured to: identify the device in the field; and in response to the switching operation being allowed, unlock a lock associated with the device to allow the switching operation to be performed.

In a further variation, the smart key identifies the device by checking an RFID associated with the device.

In a variation on this embodiment, the switching devices include at least one electrically operated device and one manually operated device.

In a variation on this embodiment, the status database is configured to receive status information from a supervisory control and data acquisition (SCADA) system and/or a handheld smart key.

In a variation on this embodiment, the topology-extraction mechanism is further configured to construct a node table from a one-line diagram associated with the power system.

In a variation on this embodiment, the simulation mechanism is configured to perform the simulation by performing a search that traverses the power system topology based on the rule.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a switching-sequence simulation system. The switching-sequence simulation system includes a simulation engine, a topology analyzer, and a rule database. The topology analyzer analyzes the topology of a substation based on the single-line diagram of the substation and constructs a node table, which includes status information of each node and the connectivity information among all nodes. The rule database stores a set of predetermined operation rules. Users of the simulation system are allowed to view and edit the operation rules stored in the rule database. In response to an operation request, the simulation engine calculates a switching logic expression based on the topology node table and the rule database. If the switching logic expression states that the requested operation is allowable, the switching-sequence simulation system notifies the user that the operation request is granted. Otherwise, the switching-sequence simulation system notifies the user that the operation request is denied.

Smart-Interlock System

Figure 1:
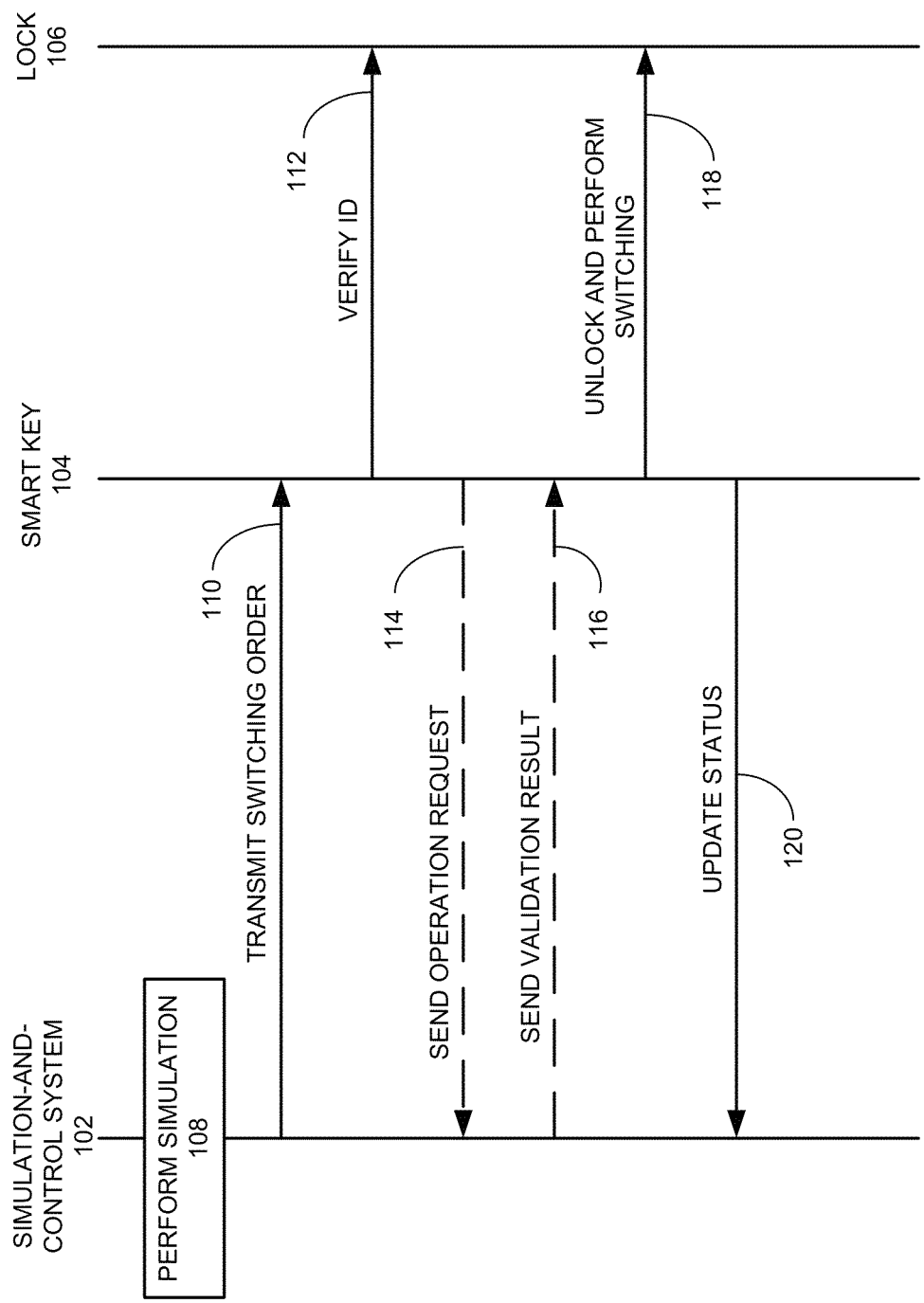
FIG. 1 presents a diagram illustrating the process of the "five-step" method, in accordance with an embodiment of the present invention.

To prevent possible switching errors involved in a switching operation, in embodiments of the present invention, a transmission substation or a switching/dispatching center implements a smart-interlock system (SIS), which combines the reliability of mechanical interlocking and the flexibility of electrical interlocking. The SIS includes a central simulation-and-control system, a smart key, and various types of locks; and uses a "five-step" method to ensure switching safety. The five steps for performing safe switching include: a simulation step, a switching-order transmission step, a device ID verification step, an operation-permission revalidation step, and a switching-completion step. FIG. 1 presents a diagram illustrating the process of the "five-step" method, in accordance with an embodiment of the present invention.

Before an actual switching takes place, a simulation is performed to ensure that the proposed switching sequence is safe (operation 108). Note that this simulation can be performed by a simulation-and-control system 102 located in the substation control room. The switching-sequence simulation outputs a switching order that specifies which equipment is to be operated on and the order of the operations. Subsequently, the switching order is transmitted to a smart key 104 during the switching-order transmission step (operation 110). Smart key 104 is a handheld device that is capable of communicating, using various wireless communication protocols (such as ZigBee or CDMA), with the simulation-and-control system. In addition, smart key 104 is capable of interacting and unlocking various locks, such as a lock 106, associated with the switching equipment. Note that the locks are attached to the equipment, and operations on the equipment require unlocking these locks using smart key 104. Smart key 104 can be carried by a person designated to perform the switching operation in the field, where the equipment is located. During the device-ID verification step, the field person uses smart key 104 to verify that the equipment to be operated on is the identified equipment by checking an identifier associated with the equipment (operation 112). For example, a lock (such as a padlock) attached to the equipment can be embedded with an RFID, and an RFID detector included in the smart key can read this RFID in order to verify the identity of the equipment. Once the ID of the equipment to be operated on has been verified, the field person can optionally revalidate the operation by sending the operation request for the current equipment back to simulation-and-control system 102 via smart key 104 (operation 114) and receiving a validation result from simulation-and-control system 102 (operation 116). Note that this revalidation process (operations 114 and 116) is optional. Subsequent to receiving the revalidation result, the field person uses smart key 104 to unlock lock 106 (either an electronic lock or a mechanical lock) and performs the actual switching (operation 118). For example, the field person may need to unlock a padlock in order to move the swing handle of a disconnect switch; or he may need to unlock a lock on the door of a cabinet in order to operate on equipment inside the cabinet. Note that the operation can be a manual operation that requires the field person to physically move a switch handle or an automated, electrically operated operation. After completion of the switching operation, smart key 104 updates the status of the equipment by transmitting its current status back to simulation-and-control system 102 (operation 120).

Simulation-and-Control System

Figure 2:
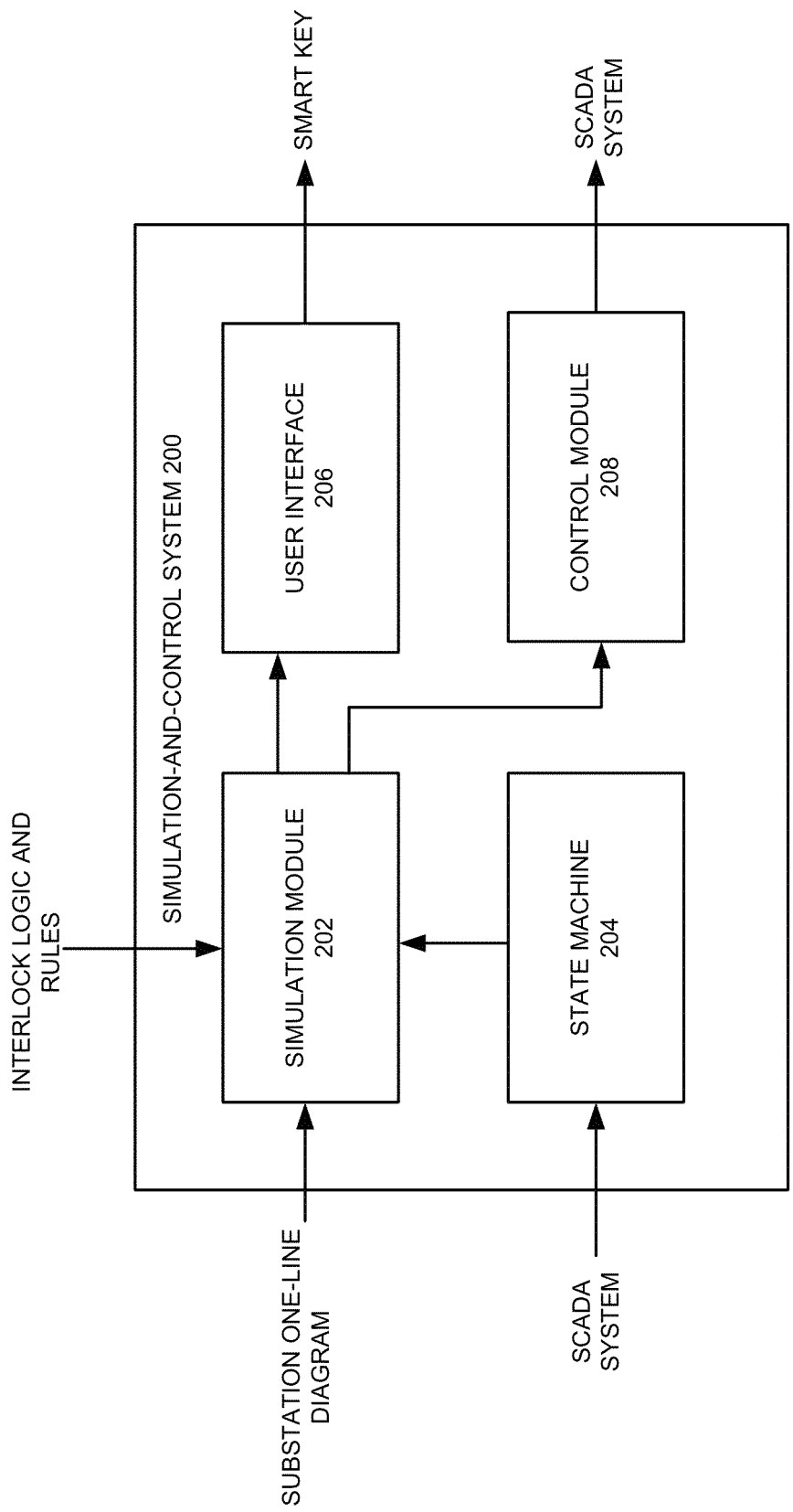
FIG. 2 presents a diagram illustrating the architecture of a simulation-and-control system, in accordance with an embodiment of the present invention.

The simulation-and-control system is an essential part of the SIS. It uses the one-line diagram of a substation to obtain the circuitry topology; collects current equipment status; collects and models switching interlock logic and rules; and simulates the switching sequence based on the circuitry topology, current equipment status, and switching interlock logic and rules. FIG. 2 presents a diagram illustrating the architecture of a simulation-and-control system, in accordance with an embodiment of the present invention. Simulation-and-control system 200 includes a simulation module 202, a state machine 204, a user interface 206, and a control module 208.

Figure 3:
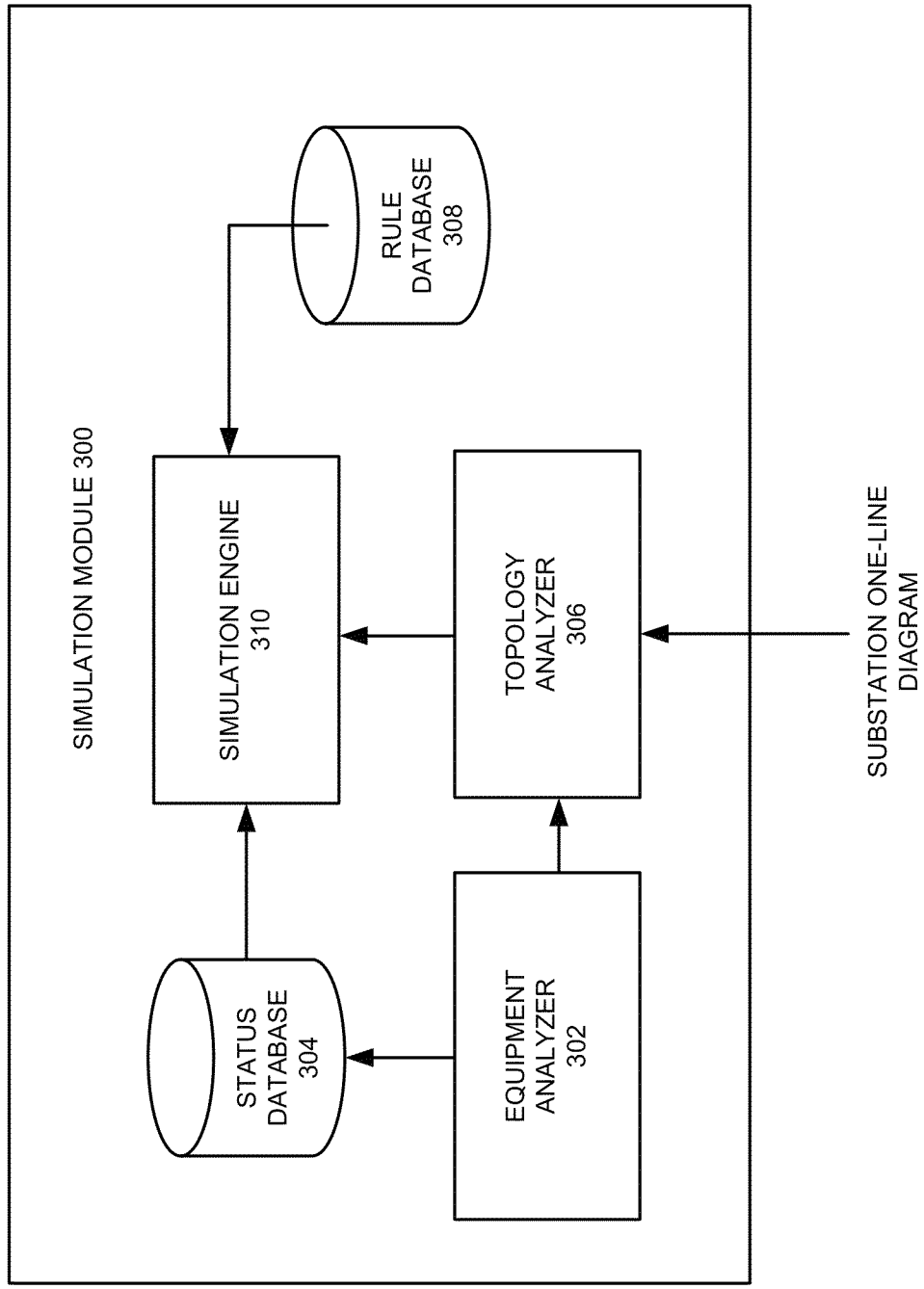
FIG. 3 presents a diagram illustrating the architecture of the simulation module, in accordance with an embodiment of the present invention.

During operation, state machine 204 receives the current status of the equipment in a substation from a supervisory control and data acquisition (SCADA) system, which performs the remote operation surveillance for the SIS, and sends the equipment status information to simulation module 202. Simulation module 202 performs switching sequence simulation using current equipment status, topology information extracted from the substation one-line diagram, and the switching interlock logic and rules. The detailed structure of simulation module 202 is shown in FIG. 3. Based on the simulation result, simulation module 202 generates a switching order. User interface 206 displays possible error information and system warnings, and communicates with the smart key. In addition, control module 208 issues control commands to the SCADA system to realize the remote control operations.

Simulation-and-control system 200 can reside on any type of computer system based on microprocessors, such as a standalone mainframe computer or a cluster of computer servers.

FIG. 3 presents a diagram illustrating the architecture of the simulation module, in accordance with an embodiment of the present invention. Simulation module 300 includes an equipment analyzer 302, a status database 304, a topology analyzer 306, a rule database 308, and a simulation engine 310.

Equipment analyzer 302 analyzes the structural components of each piece of equipment associated with the switching operation, and decomposes a piece of complex equipment into a number of basic components, such as circuit breakers, disconnects, and ground disconnects, that fulfill the electrical functionality of the complex equipment. For example, a three-position knife switch is decomposed to two basic components: a knife switch and a ground knife switch. The three switching positions correspond to different switching positions of the knife switch and the ground knife switch. Note that after a piece of complex equipment is decomposed into multiple basic components, connections to other external equipment are mapped onto corresponding ends on the basic components. The output of equipment analyzer 302, including the status of the basic components and their connection information, is stored in status database 304. Note that the status information of the components can be updated by the smart key. In one embodiment, after each operation, the smart key updates the status of the equipment being operated on. Such an arrangement makes it possible for the system to maintain real-time status information of all equipment, including manually operated equipment in the field, such as a manual switch or a locked door for a switching bay.

Topology analyzer 306 analyzes the topology of a substation based on the one-line diagram and the decomposition outcome of each piece of complex equipment. In one embodiment, topology analyzer 306 constructs a node table, which includes the status of the nodes and connection information among the nodes. Note that each node in the node table corresponds to a topology node extracted from the one-line diagram of the substation. In one embodiment, a topology node corresponds to a crossing point on the one-line diagram, which can include one or more equipment endpoints. Note that a single topology node may be associated with multiple endpoints, whereas a particular endpoint can only be associated with a single topology node.

Rule database 308 stores switching interlock logic and rules, which can be either programmed ahead of time by the manufacturer of the SIS or defined by the user of the SIS. For example, to prevent operations on a loaded knife switch, rule database 308 stores a rule stating that no operation (either opening or closing) is allowed on a knife switch when the knife switch is coupled to a closed circuit breaker. Note that these rules generally describe allowed or disallowed operations of basic components, regardless of their relative locations in the system topology. The independent relationship between rule database 308 and the system topology provides scalability for the SIS. When the substation scales up, such as with the addition of new equipment, instead of reprogramming the entire simulation software, one only needs to input the updated one-line diagram into topology analyzer 306. Moreover, when safety rules and regulations are changed, only rule database 308 needs to be updated. Such updating can be made by users of the SIS. In one embodiment, the switching interlock logic and rules are stored in a table, and the user is allowed to add, delete, or make changes to the table entries. In a further embodiment, an entry in rule database 308 includes three components: equipment type, operation type, and expression of the rule specific to the equipment and the operation. The equipment type component specifies the type of equipment (such as breakers, knife switches, and ground wires) that this rule is applied to; the operation type specifies which operation (such as opening or closing) that this rule is applied to; and expression of the rule is a logic expression describing the error-prevention rule. Such a logic expression is specific to the type of equipment and the type of operation, and remains unrelated to any specific piece of equipment within the system. In the aforementioned example, a corresponding entry for closing a knife switch in rule database 308 can be expressed as: KNIFE SWITCH, CLOSING: KNIFE SWITCH UNLOADED. Such a rule is applied to all knife switches in the system, including a knife switch that was included in and decomposed from a piece of complex equipment.

Once the system receives an operation request on a piece of equipment, simulation engine 310 performs a simulation to determine whether the requested operation is allowed based on the topology node table constructed by topology analyzer 306, equipment status information extracted from status database 304, and operation rules extracted from rule database 308.

Figure 4:
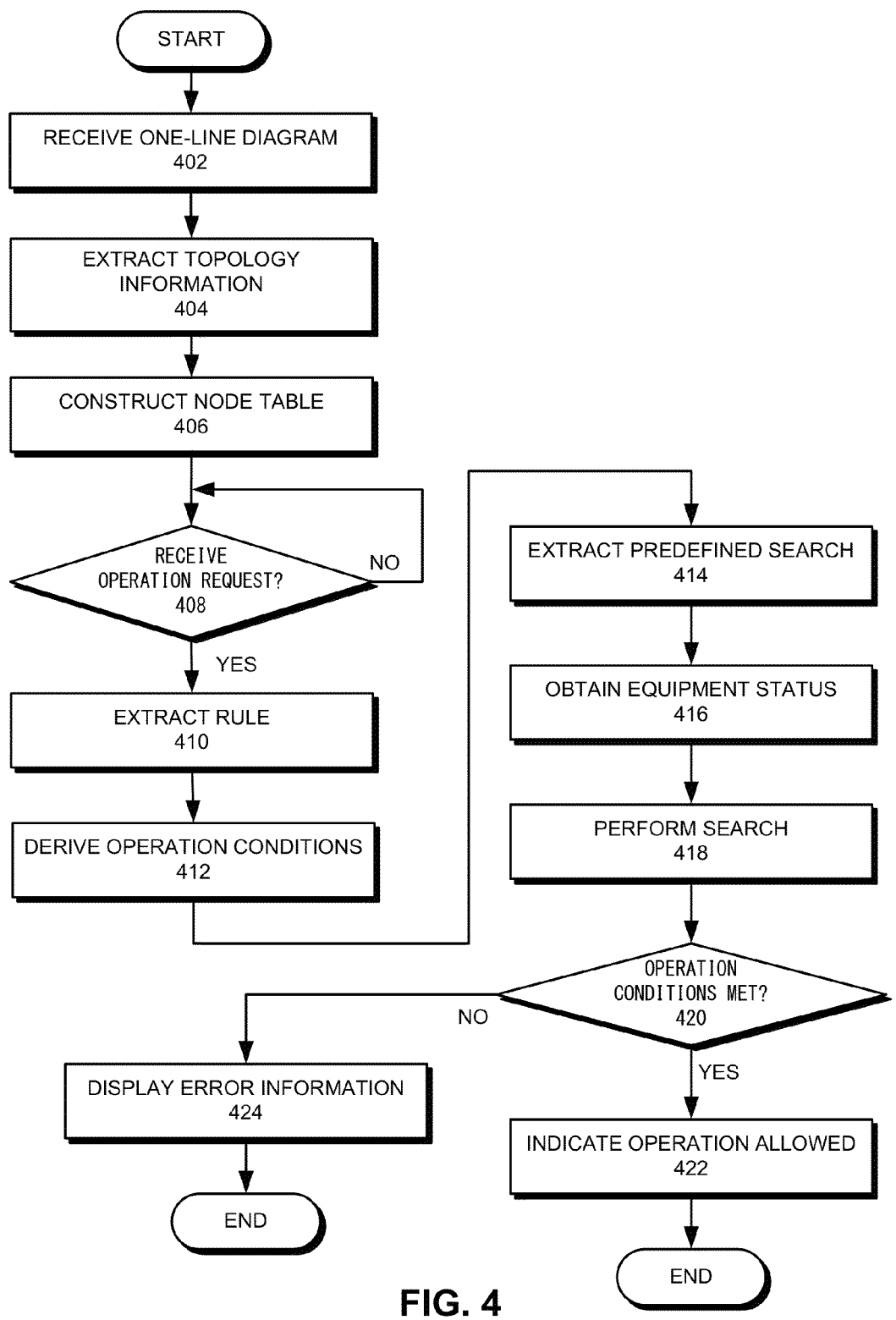
FIG. 4 presents a flow chart illustrating the operation process of the switching-error prevention system, in accordance with an embodiment of the present invention.

FIG. 4 presents a flow chart illustrating the operation process of the switching-error prevention system, in accordance with an embodiment of the present invention. Prior to receiving a request to perform a switching operation, the system goes through an initialization process, which includes receiving the one-line diagram of a power plant or a substation (operation 402), extracting topology information from the one-line diagram (operation 404), and constructing a topology node table (operation 406). Note that this initialization process can be performed when the power system is brought online, or when the power system experiences equipment update. The system waits for a request for an operation on a particular piece of equipment, such as a request for closing a knife switch (operation 408). Upon receiving such a request, the system extracts a rule associated with the equipment and the operation from the rule database (operation 410). Based on the rule, the system derives a number of operating conditions complying with the rule (operation 412). For example, a rule associated with closing a knife switch states that such an operation requires that the knife switch be unloaded, and the operating conditions that satisfy this rule include: all circuit breakers coupled to the knife switch being open, and at least one side of the knife switch being unloaded.

Based on the derived operating conditions, the system extracts a predefined search associated with that rule. Such a search starts from one or more endpoints of the equipment and traverses the electrical connectivity topology (operation 414). The targets and boundary of the search are defined by the operating conditions. For example, to determine whether the condition of all coupled circuit breakers being open is met, the system first defines a search boundary, which includes circuit breakers and open knife switches. In other words, a search originating from a node and traversing the topology will come to a stop once a circuit breaker or a knife switch is met. The search target is a closed circuit breaker. Note that if the search returns a closed circuit breaker, it indicate a violation of the operation condition. Similarly, to determine whether the condition of at least one end of the knife switch being unloaded is met, the system first defines a search boundary, which includes open circuit breakers and open knife switch. The search targets include loaded devices or a power supplies. The system then obtains the current status of the equipment within the topology (operation 416). In one embodiment, the system interfaces with an EMS (Energy Management System)/SCADA system to obtain the current operational status (such as positions of a switch) of the equipment. In a further embodiment, the current status of the equipment can be obtained by the smart key.

Subsequently, the system performs the search that traverses the topology (operation 418). The search starts from one or more endpoints of the equipment. In the example of the knife switch, the search starts from both ends of the knife switch. The search traverses the electrical connectivity topology, and collects equipment associated with the operating conditions. For example, using the operating condition that all circuit breakers coupled to the knife switch are open, the system defines a search boundary that includes open circuit breakers and open knife switches, and the search targets include loaded devices and power supplies. Based on the search result and the current equipment status, the system determines whether the operating conditions are met (operation 420). If the operating conditions are met, the system indicates to the user that the operation is allowed (operation 422). Otherwise, the system displays error information to the user (operation 424). In one embodiment, the error information includes the search result indicating the violated operating condition. In the example of the knife switch, the search may find a coupled circuit breaker having a current status of being closed, and indicate to the user that operations on the knife switch are prohibited due to the status of that particular circuit breaker. Note that such information can be used by the user to correct the situation. In the above example, the error information indicates that operations on the knife switch are prohibited because a coupled circuit breaker is closed. The user can then attempt to open the circuit breaker first in order to operate on the knife switch. In a further embodiment, if the violated operating condition is not a critical condition (such as a one that does not violate a safety rule), the error message may include an option that allows the user to override the decision made by the system. Based on the user's input, the system may indicate that such an operation is allowed or not.

An Operation Example

Figure 5:
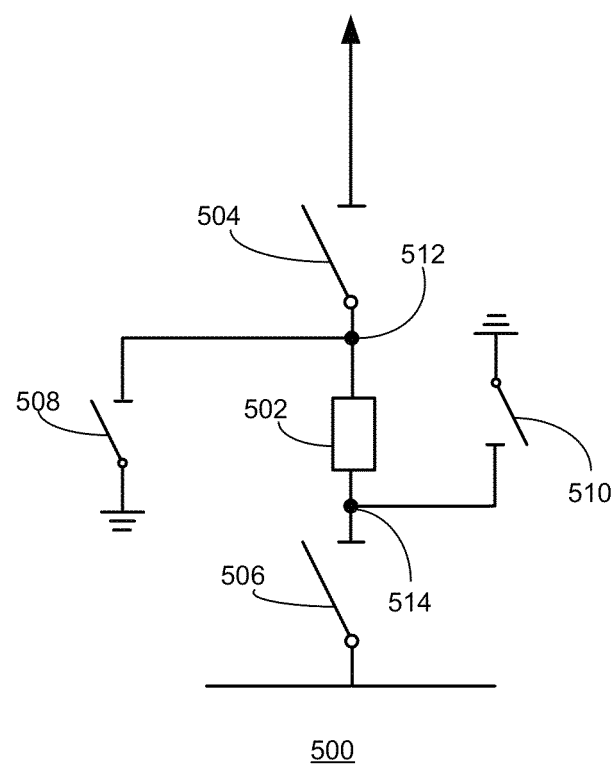
FIG. 5 presents a portion of an exemplary one-line diagram.

FIG. 5 presents a portion of an exemplary one-line diagram. One-line diagram 500 includes a breaker 502, two knife switches 504 and 506, and two ground switches 508 and 510. During initialization, the switching-error prevention system extracts connectivity topology information from one-line diagram 500 and constructs a node table. The node table includes a number of topology nodes (such as nodes 512 and 514) and connectivity information associated with the switching devices. For example, one endpoint of ground switch 510 is coupled to an endpoint of knife switch 506 and an endpoint of breaker 502 at node 514.

Upon receiving an operation request to close ground switch 510, the system extracts a rule stating that before the closing operation can take place on a ground switch, the ground switch needs to be isolated from other equipment. Based on the rule, the system determines that the corresponding operating condition is that all knife switches coupled to ground switch 510 remain open. Based on the operating condition, the system defines a search for a closed knife switch coupled to ground switch 510. This search starts from the ungrounded end of ground switch 510, and traverses the entire topology The search boundary includes knife switches and the search targets include closed knife switches. An empty search result indicates that ground switch 510 is isolated from other equipment. Consequently, the system determines that the operating condition is met, and the operation of closing ground switch 510 is allowed. Note that if a knife switch coupled to ground switch 510, such as knife switch 506, is closed, the system will determine that the requested closing operation of ground switch 510 is prohibited, and display an error message to the user. The message can notify the user that the requested operation is prohibited because knife switch 506 is closed.

User Interface

Figure 6:
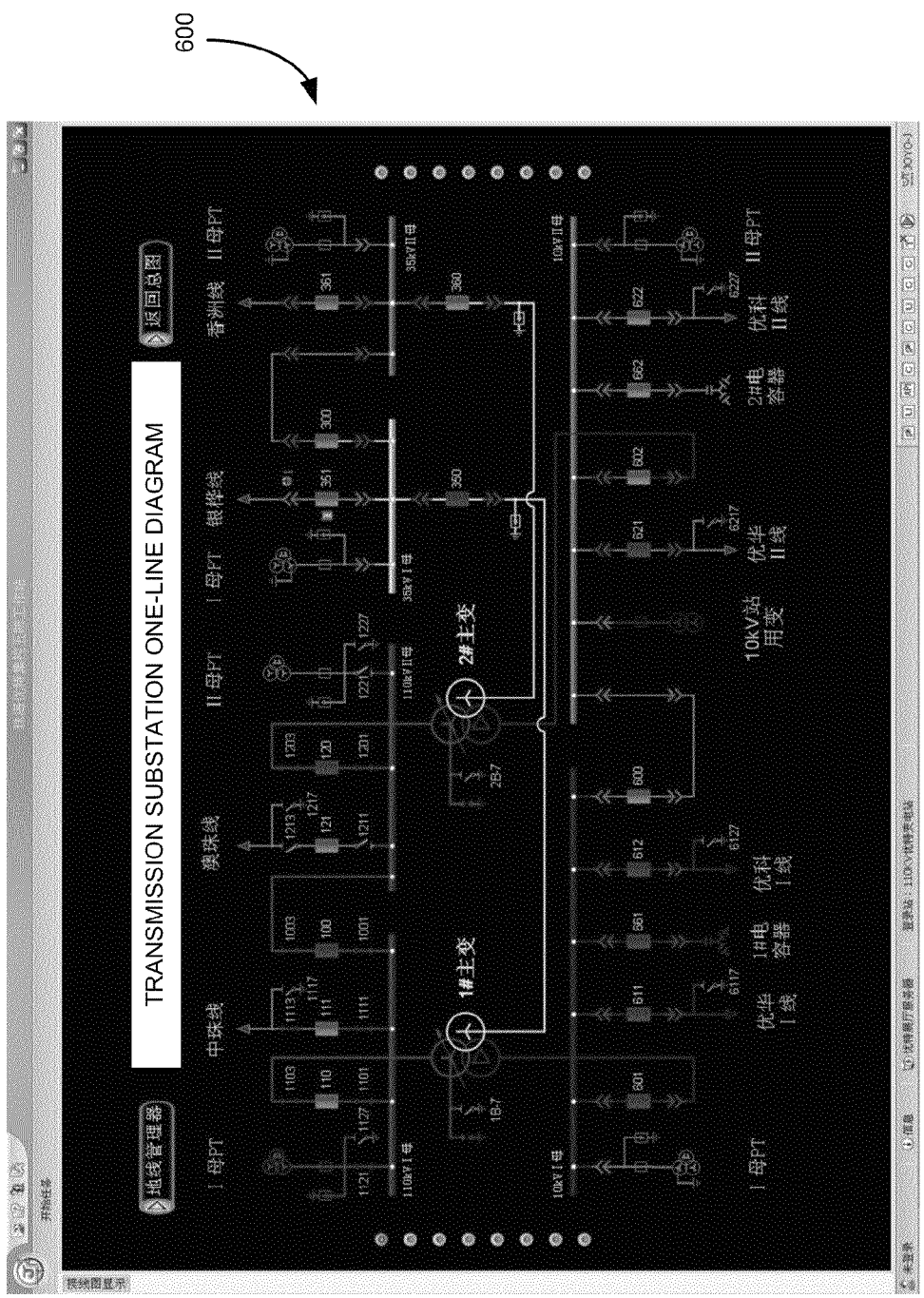
FIG. 6 presents a diagram illustrating an exemplary user interface, in accordance with an embodiment of the present invention.

FIG. 6 presents a diagram illustrating an exemplary user interface, in accordance with an embodiment of the present invention. In one embodiment, the switching-error prevention system includes a graphic user interface (GUI) that enables a user to interact with the switching-error prevention system.

The GUI can be presented to the user on various types of display mechanisms, such as a standard computer display or a touch-screen display. In FIG. 6, GUI 600 displays the one-line diagram of a substation. In one embodiment, the displayed one-line diagram also displays the current status of the equipment, such as a switch being open or close. A user can request an operation on a piece of switching equipment by pointing and clicking an icon on the diagram corresponding to the equipment. The simulation result in response to the operation request is presented to the user via GUI 600.

In one embodiment of the present invention, GUI 600 can switch the view from the one-line diagram shown in FIG. 6 to a view that displays a table associated with the rule database. The table view of the rule database enables the user to make changes to the rule database by adding, deleting, and modifying entries in the table.

Computer System

Figure 7:
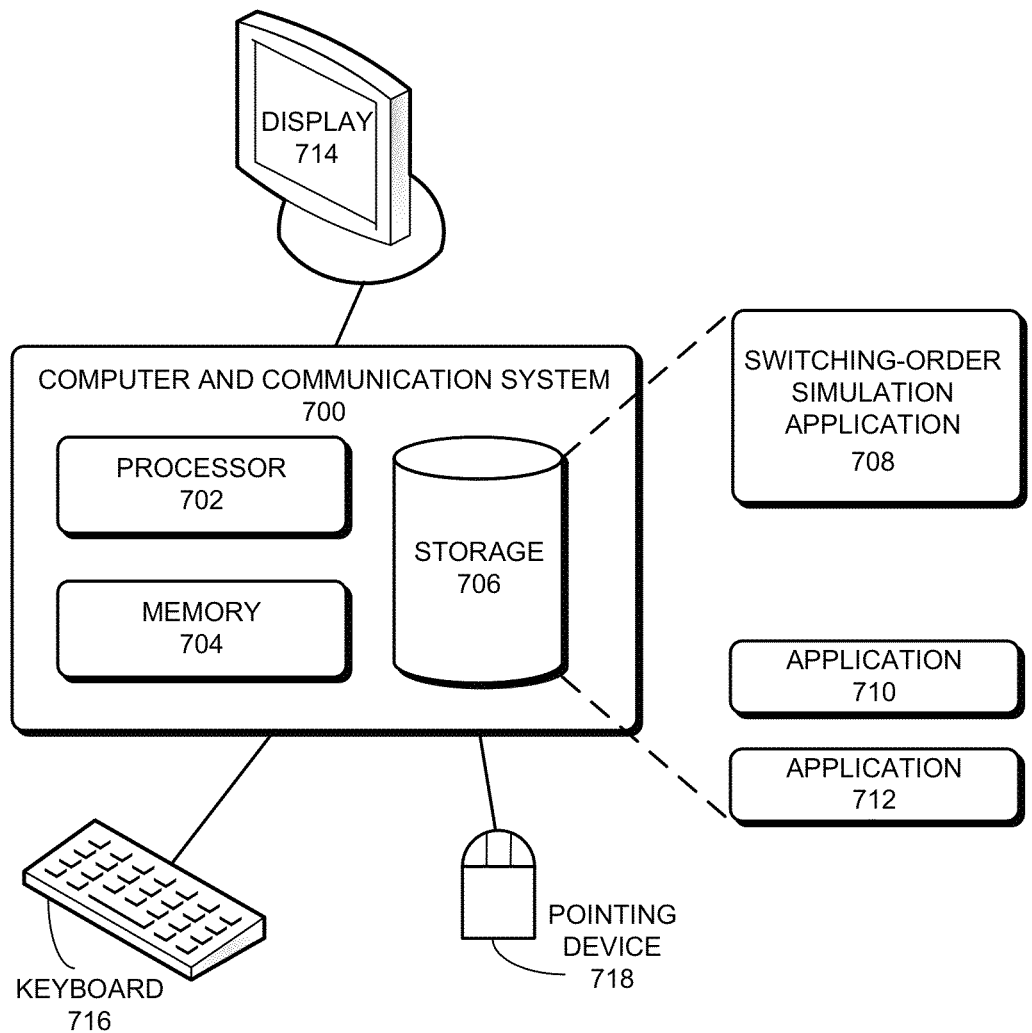
FIG. 7 presents a diagram illustrating an exemplary computer system for performing switching-order simulations, in accordance with an embodiment of the present invention.

FIG. 7 presents a diagram illustrating an exemplary computer system for performing switching-order simulations, in accordance with an embodiment of the present invention. In one embodiment, a computer and communication system 700 includes a processor 702, a memory 704, and a storage device 706. Storage device 706 stores a switching-order simulation application 708, as well as other applications, such as applications 710 and 712. During operation, switching-order simulation application 708 is loaded from storage device 706 into memory 704 and then executed by processor 702. While executing the program, processor 702 performs the aforementioned functions. Computer and communication system 700 is coupled to an optional display 714, keyboard 716, and pointing device 718. The display, keyboard, and pointing device can facilitate switching-order simulation.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for preventing switching errors in a power system that includes a plurality of switching devices, comprising:
    extracting, by a computer, topology information associated with the power system;
    obtaining current status information associated with the switching devices;
    receiving, from a user, a request for performing a switching operation on a device in the power system;
    in response to receiving the request, extracting a basic operation rule associated with the device and the switching operation from a rule database that stores user-definable operation rules, wherein the extracted basic operation rule is independent of a location of the device in the extracted topology, wherein the extracted basic operation rule specifies a type of the device, a type of the switching operation, and a logic expression specific to the type of the device and the type of the switching operation, and wherein the logic expression of the extracted basic operation rule is independent of the extracted topology;
    performing a simulation based on the extracted topology, the obtained current status, and the extracted basic operation rule that is independent of the location of the device;
    determining whether the extracted basic operation rule is violated based on the simulation outcome; and in response to determining that the extracted basic operation rule is violated, displaying an error message to the user to prevent the user from performing the switching operation.

2. The method of claim 1, further comprising:
transmitting the outcome of the simulation to a handheld smart key, which is configured to:
identify the device in field; and
in response to the outcome of the simulation not indicating that the extracted basic operation rule associated with the device and the switching operation is violated, unlock a lock associated with the device to allow the switching operation to be performed.

3. The method of claim 2, wherein identifying the device involves checking a radio frequency identification (RFID) associated with the device.

4. The method of claim 1, wherein the switching devices include at least one electrically operated device and one manually operated device.

5. The method of claim 1, wherein obtaining the status information associated with the switching devices involves use of a supervisory control and data acquisition (SCADA) system or a handheld smart key.

6. The method of claim 1, wherein extracting the topology information involves constructing a node table from a one-line diagram associated with the power system.

7. The method of claim 1, further comprising:
decomposing a complex device into a plurality of basic components; and
obtaining status information associated with each basic component.

8. A non-transitory computer-readable storage medium storing instructions that when executed by a computer cause the computer to perform a method for preventing switching errors in a power system that includes a plurality of switching devices, wherein the method comprises:
extracting topology information associated with the power system;
obtaining current status information associated with the switching devices;
receiving, from a user, a request for performing a switching operation on a device in the power system;
in response to receiving the request, extracting a basic operation rule associated with the device and the switching operation from a rule database that stores user-definable operation rules, wherein the extracted basic operation rule is independent of a location of the device in the extracted topology, wherein the extracted basic operation rule specifies a type of the device, a type of the switching operation, and a logic expression specific to the type of the device and the type of the switching operation, and wherein the logic expression of the extracted basic operation rule is independent of the extracted topology;
performing a simulation based on the extracted topology, the obtained current status, and the extracted basic operation rule that is independent of the location of the device;
determining whether the extracted basic operation rule is violated based on the simulation outcome; and
in response to determining that the extracted basic operation rule is violated, displaying an error message to the user to prevent the user from performing the switching operation.

9. The computer-readable storage medium of claim 8, wherein the method further comprises:
transmitting the outcome of the simulation to a handheld smart key, which is configured to:
identify the device in field; and
in response to the outcome of the simulation not indicating that the extracted basic operation rule associated with the device and the switching operation is violated, unlock a lock associated with the device to allow the switching operation to be performed.

10. The computer-readable storage medium of claim 9, wherein identifying the device involves checking a radio frequency identification (RFID) associated with the device.

11. The computer-readable storage medium of claim 8, wherein the switching devices include at least one electrically operated device and one manually operated device.

12. The computer-readable storage medium of claim 8, wherein obtaining the status information associated with the switching devices involves use of a supervisory control and data acquisition (SCADA) system or a handheld smart key.

13. The computer-readable storage medium of claim 8, wherein extracting the topology information involves constructing a node table from a one-line diagram associated with the power system.

14. A computer system for preventing switching errors in a power system that includes a plurality of switching devices, comprising:
a processor;
a topology-extraction mechanism configured to extract topology information associated with the power system;
a status database configured to store status information associated with the switching devices;
a rule database configured to store user-definable operation rules associated with the switching devices;
a receiving mechanism configured to receive, from a user, a request for performing a switching operation on a device in the power system;
a rule-extracting mechanism configured to extract, in response to the receiving mechanism receiving the request, a basic operation rule associated with the device and the switching operation form the rule database, wherein the extracted basic operation rule is independent of a location of the device in the extracted topology, wherein the extracted basic operation rule specifies a type of the device, a type of the switching operation, and a logic expression specific to the type of the device and the type of the switching operation, and wherein the logic expression of the extracted basic operation rule is independent of the extracted topology;
a simulation mechanism configured to perform a simulation based on the extracted topology, obtained current status, and the extracted basic operation rule that is independent of the location of the device;
a determination mechanism configured to determine whether the basic operation rule is violated based on the simulation outcome;
a display mechanism configured to display, in response to the determination mechanism determining that the basic operation rule is violated, an error message to the user to prevent the user from performing the switching operation.

15. The computer system of claim 14, further comprising a transmission mechanism and a handheld smart key, wherein the transmission mechanism is configured to transmit the outcome of the simulation to the smart key, and wherein the smart key is configured to:
identify the device in field; and
in response to the outcome of the simulation not indicating that the extracted basic operation rule associated with the device and the switching operation is violated, unlock a lock associated with the device to allow the switching operation to be performed.

16. The computer system of claim 15, wherein the smart key identifies the device by checking a radio frequency identification (RFID) associated with the device.

17. The computer system of claim 14, wherein the switching devices include at least one electrically operated device and one manually operated device.

18. The computer system of claim 14, wherein the status database is configured to receive status information from a supervisory control and data acquisition (SCADA) system or a handheld smart key.

19. The computer system of claim 14, wherein the topology-extraction mechanism is further configured to construct a node table from a one-line diagram associated with the power system.

\* \* \* \* \*